United States Patent
Wu et al.

(10) Patent No.: US 8,716,644 B2
(45) Date of Patent: May 6, 2014

(54) GLARE REDUCTION APPARATUS

(75) Inventors: E-In Wu, Taipei County (TW);
Tai-Chang Wu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 12/833,915

(22) Filed: Jul. 9, 2010

(65) Prior Publication Data

US 2011/0233384 A1 Sep. 29, 2011

(30) Foreign Application Priority Data

Mar. 26, 2010 (TW) ............... 99109040 A

(51) Int. Cl.
*G01J 1/44* (2006.01)

(52) U.S. Cl.
USPC ........ 250/208.2; 250/203.4; 351/45; 359/608

(58) Field of Classification Search
USPC ............ 250/203.1–203.4, 208.2; 349/13, 14; 351/44, 45; 345/7, 9; 359/601, 608, 359/611

See application file for complete search history.

(56) References Cited

U.S. PATENT DOCUMENTS

| | | | |
|---|---|---|---|
| 5,298,732 A | 3/1994 | Chen | |
| 5,305,012 A | 4/1994 | Faris | |
| 5,671,035 A | 9/1997 | Barnes | |
| 6,134,719 A | 10/2000 | Kuo | |
| 6,864,473 B2 * | 3/2005 | Chretien et al. | 250/201.1 |
| 7,134,707 B2 | 11/2006 | Isaac | |
| 2009/0058126 A1 | 3/2009 | Broude et al. | |

FOREIGN PATENT DOCUMENTS

| | | |
|---|---|---|
| CN | 2736198 Y | 10/2005 |
| CN | 101607520 A | 12/2009 |
| JP | 2-117414 A | 5/1990 |
| JP | 2003165334 | 6/2003 |

OTHER PUBLICATIONS

Masahiro Yasuno et al. "Pedestrian Detection and Tracking in Far Infrared Images", Proceedings of the 8th International IEEE Conference on Intelligent Transportation Systems, Sep. 13-16, 2005, p. 131-136, IEEE, Austria.
Csaba Beleznai et al. "Human Tracking by Mode Seeking", Proceedings of the 4th Internaitonal Symposium on Image and Signal Processing and Analysis, 2005, p.1-6, IEEE, Austria.
Hiromi Yoshida et al. "A New Binarization Method for a Sign Board Image with the Blanket Method", p. 1-4, IEEE, US, 2009.
China Patent Office, Office Action, Patent Application Serial No. 201010178008.9, Sep. 13, 2012, China.
China Patent Office, Office Action, Patent Application Serial No. 201010178008.9, Apr. 9, 2013, China.
Taiwan Patent Office, Office Action, Patent Application Serial No. 099109040, Dec. 19, 2012, Taiwan.

* cited by examiner

*Primary Examiner* — Kevin Pyo

(57) ABSTRACT

The invention provides a glare reduction apparatus disposed in an object illuminated by a light source. The glare reduction device includes an electro-optical device covering a surface of the object. A light sensing device is disposed on a first fixed point of the object. A controller is electrically coupled to the electro-optical device and the light sensing device, wherein the controller calculates a corresponding light sensing position of the electro-optical device according to a light sensing position of the light sensing device which directly receives light from the light source, to reduce the light transmittivity of the corresponding light sensing position of the electro-optical device to generate a light shielding region. The light shielding region attenuates the light from the light source to a second fixed point of the object.

12 Claims, 8 Drawing Sheets

GLARE REDUCTION APPARATUS

CROSS REFERENCE TO RELATED APPLICATIONS

This application claims priority of Taiwan Patent Application No. 099109040, filed on Mar. 26, 2010, the entirety of which is incorporated by reference herein.

BACKGROUND OF THE INVENTION

1. Field of the Invention

The present disclosure relates to a glare reduction apparatus, and in particular, to a glare reduction apparatus for automatic determination of glare.

2. Description of the Related Art

On a sunny day, especially in the mornings or in the afternoons, the glare of the sun affects the vehicle or motorcycle drivers when driving in the direction of the sun. If the glare of the sun is at an angle close to the height of traffic signs, when drivers look at the traffic signs, the look almost directly toward the sun. As such, drivers are unable to distinguish the traffic signs, which may cause a traffic safety problem. Additionally, at night, glare of a headlight of a vehicle travelling directly toward drivers affect the road vision of drivers. While special glasses may be used to reduce glare, vision is also hindered thereby. Namely, when a tunnel, special glasses may darken the vision of drivers, which may also cause a traffic safety problem.

Thus, a novel glare reduction apparatus is desired to solve the aforementioned problems.

BRIEF SUMMARY OF INVENTION

A glare reduction apparatus disposed in an object illuminated by a light source is provided. An exemplary embodiment of a glare reduction apparatus disposed in an object illuminated by a light source, comprises an electro-optical device covering a surface of the object. A light sensing device is disposed on a first fixed point of the object. A controller is electrically coupled to the electro-optical device and the light sensing device, wherein the controller calculates a corresponding light sensing position of the electro-optical device according to a light sensing position of the light sensing device which directly receives light from the light source, to reduce the light transmittivity of the corresponding light sensing position of the electro-optical device to generate a light shielding region which attenuates the light from the light source to a second fixed point of the object.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

Figure 1:
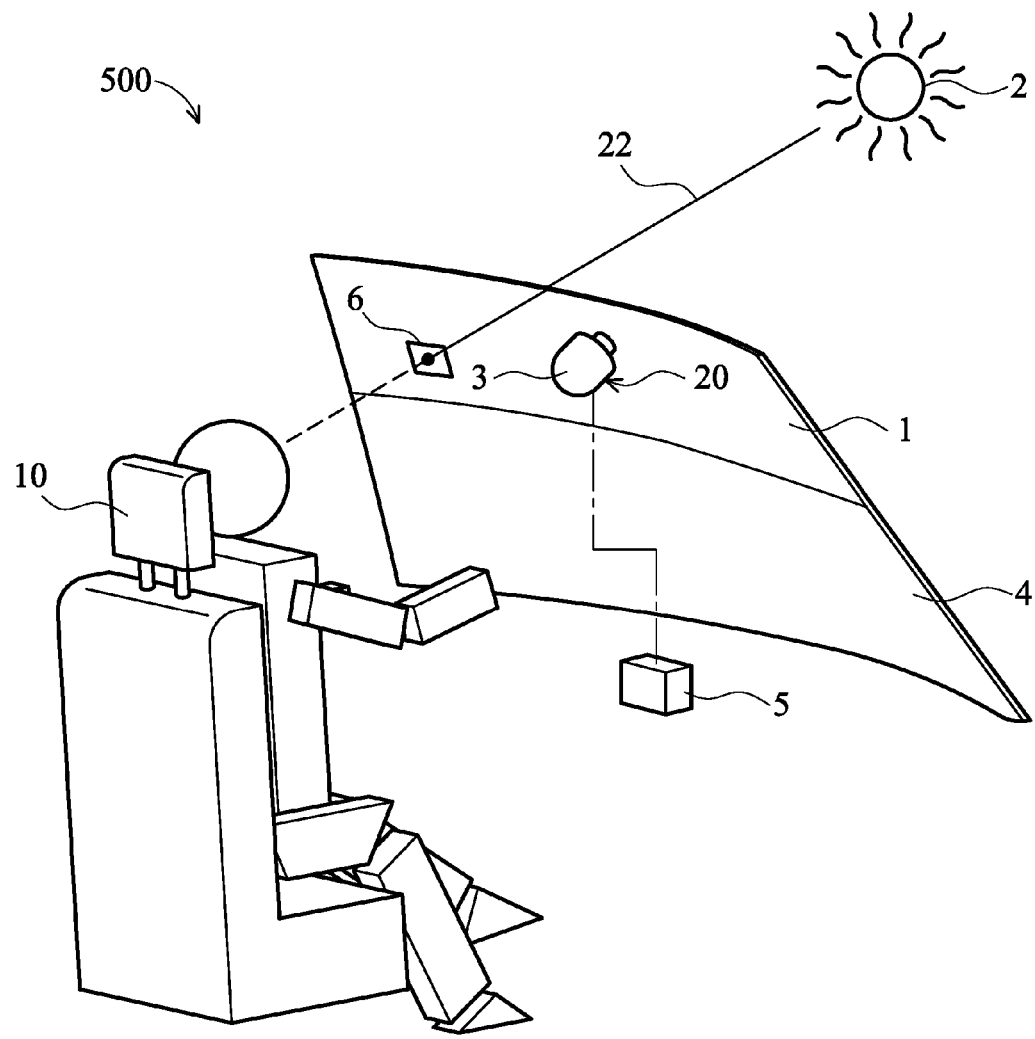
FIG. 1 is a schematic view of one exemplary embodiment of a glare reduction apparatus of the invention.

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

FIG. 1 is a schematic view of one exemplary embodiment of a glare reduction apparatus 500 of the invention. The glare reduction apparatus 500 may be disposed on a windshield glass of a vehicle or a safety helmet to change local transmittivity, to attenuate glare from the sun or headlights of oncoming vehicles at night. As shown in FIG. 1, FIG. 1 illustrates the glare reduction apparatus 500 disposed on a vehicle. The glare reduction apparatus 500 comprises an electro-optical device 1 covering a surface of an object, for example, a surface of a windshield glass 4 of a vehicle. In one embodiment, the electro-optical device 1 may comprise thin film electro-optical devices with an ability to change local transmittivity; for example, a liquid crystal display (LCD), a lead lanthanum zirconium titanate (PLZT) dielectric film, an electro-chromic device or other electro-magnetic devices. The electro-optical device 1 is in a transparent status when not being used. Additionally, the electro-optical device 1 may comprise a flexible electro-optical device, for example, a flexible LCD, to conformably cover the surface of an object. In one embodiment, the electro-optical device 1 may cover a portion of the windshield glass 4 or totally cover the windshield glass 4. As shown in FIG. 1, in one embodiment, the electro-optical device 1 covers a portion of the windshield glass 4. The electro-optical device 1, such as a flexible LCD, can only cover an upper portion of the windshield glass 4, wherein the vision of a driver would not be affected by the electro-optical device 1 when the electro-optical device 1 is not able to operate. A light sensing device 3 is disposed on a first fixed point 20 of the vehicle. In one embodiment, the first fixed point 20 is located, for example, in a region of the windshield glass 4 covered by the electro-optical device 1. In one embodiment, the light sensing device 3 may comprise a video camera, and the light sensing device 3 faces toward a front side of the vehicle, parallel to the viewing direction of a driver. In one embodiment, the glare reduction apparatus 500 uses a second fixed point 10 located on a space at the rear of the electro-optical device 1, for example, on a driver's seat headrest of a vehicle, to define a position of a pupil of the driver's eye without need for additional devices, to reduce manufacturing costs. As long as a relative position between the first fixed point and the second fixed point is fixed, the positions of the first fixed point 20 and the second fixed point 10 are not limited to the disclosed embodiments. As shown in FIG. 1, the first fixed point 20 is located between the light source 2 and the second fixed point 10. The glare reduction apparatus 500 further comprise a controller 5 disposed in the vehicle. The controller 5 may be electrically coupled to the electro-optical device 1 and the light sensing device 3. When glare is present. That is, when the light source 2 such as the sun or oncoming vehicle headlights (not shown) illuminates a light 22 directly incident to the pupil of the driver's eye (the second fixed point 10), the light sensing device 3 also receives a light parallel to a direction of the light 22. The controller 5 calculates a corresponding light sensing position of the electro-optical device 1 according to information of the light sensing position generated by the light sensing device 3 directly received by the light in the same direction to the light 22 and a position of the second fixed point 10, to reduce the light transmittivity of the corresponding light sensing position of the electro-optical device 1 to generate a light shielding region 6 to attenuate the light 22 from the light source 2 to the pupil of the driver's eye (the second fixed point 10). The electro-optical device 1 assures transparency in other regions besides the light shielding region 6, so that view of a driver is not hindered. The controller 5 may calculate an accurate position of the light shielding region 6, whether a driver's vehicle (relative to the light source 2) is moving or not, according to the information of the light sensing position of the light sensing device 3 on the first fixed point 20 and the position of the second fixed point 10 (the driver's seat headrest) without need for additional complex and expensive devices such as a navigation and global positioning system (GPS) or sensors to detect the pupil of the driver's eye. Thus, decreasing manufacturing costs of the glare reduction apparatus.

Figure 2A:
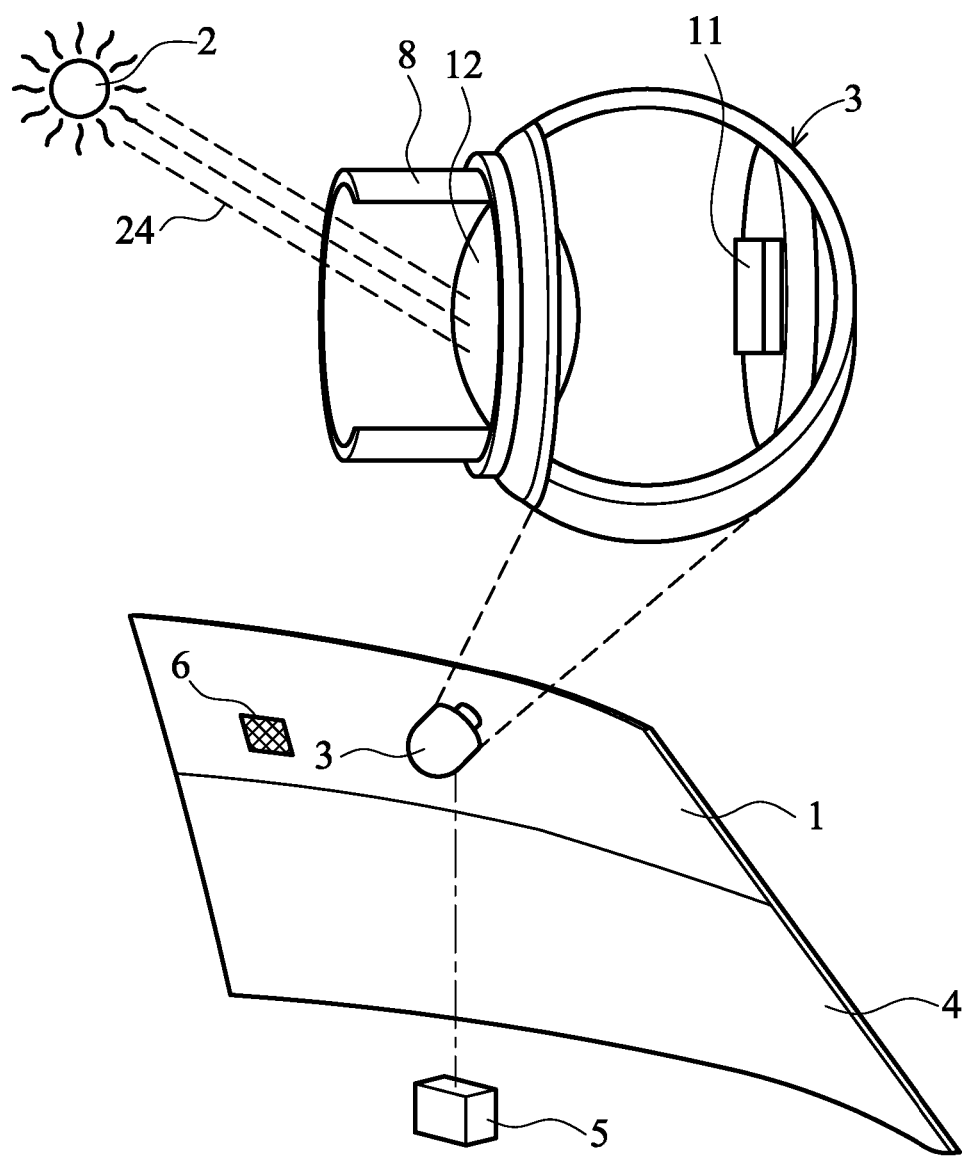
FIGS. 2A to 2B are schematic views showing a glare determination method using one exemplary embodiment of a glare reduction apparatus of the invention.
Figure 2B:
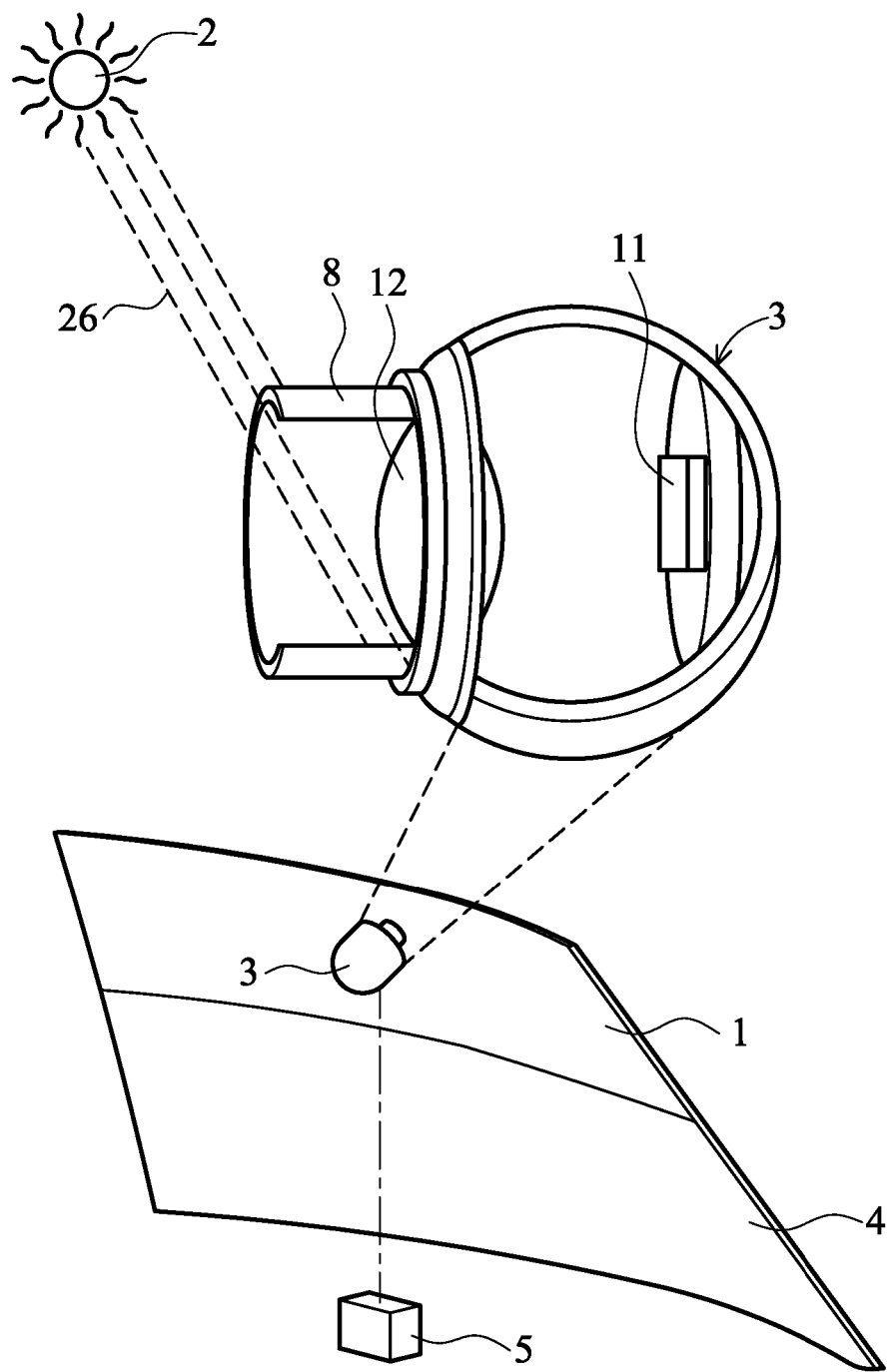

FIGS. 2A to 2B are schematic views showing a light sensing device 3 and a glare determination method using one exemplary embodiment of a glare reduction apparatus of the invention. In one embodiment, the glare reduction apparatus 3 may comprise a digital camera comprising a charge-coupled device (CCD) array 11 used for the light sensing position detection with transforming into electronic signals, which is transmitted to the controller 5. A lens 12 may be disposed in front of the CCD array 11 to guide the light being transmitted into the glare reduction apparatus 3 for detection by the CCD array 11. One exemplary embodiment of glare reduction apparatus 3 may further comprise a light blocking tube 8 disposed in front of the CCD array 11, so that the light from the light source 2 is incident through the light blocking tube 8 to the CCD array 11 in sequence. Because the horizontal angle of the view of the driver's eye, calculated from a pupil thereof, is about 200 degrees (about 100 degrees from the center to the left and right edges of the view, respectively) and a vertical angle of the view the driver's eye, calculated from a pupil thereof, is about 120 degrees (about 60 degrees from the center to the top and bottom edges of the view, respectively), an incident angle of glare toward the driver's eye has a fixed range. A light with an over large incident angle may not originate from a glare incident to the driver's eye. Therefore, the light blocking tube 8 may be disposed in front of the CCD array 11 to block the light with over large incident angles directly being transmitted into the CCD array 11 to prevent the electro-optical device 1 from generating an undesired light shielding region 6, which may affect view of a driver. As shown in FIGS. 2A and 2B, the light blocking tube 8 may have a length L, and the size of the length may be defined by a glare incident angle range to a pupil of the driver's eye. In one embodiment, the light blocking tube 8 may block the light being incident to the CCD array 11 with an incident angle larger than 60 degrees and less than or equal to 90 degrees of a vertical plane. Because the horizontal angle of the view of the driver's eye, calculated from a pupil thereof, is about 200 degrees, the light blocking tube 8 does not block the light being incident to the CCD array 11 in a horizontal plane. As shown in FIG. 2A, when the light source 2 generates a light 24 directly incident to the light sensing device 3, without being blocked by the light blocking tube 8 (that is, the pupil of the driver's eye begin to be affected by glare), the light 24 is transmitted into the light sensing device 3 and a light sensing position thereof is detected by the CCD array 11. As shown in FIG. 2B, when the light source 2 generates a light 26 of an over large incident angle, which is blocked by the light blocking tube 8 without directly being incident to the light sensing device 3 (that is, the pupil of the driver's eye is not affected by glare), the CCD array 11 does not detect a light sensing position. Thus, in this case, no electronic signals are transmitted to the controller 5. The electro-optical device 1 is not operated by the controller 5. Therefore, the electro-optical device 1 is fully transparent.

Alternatively, the controller 5 may further filter the light 24 incident into the light sensing device 3 according to an intensity, to determine whether glare is present. When light 24 has an intensity that is higher than a predefined value, glare may be determined as being present. The controller 5 may operate to discolor the electro-optical device 1 in a corresponding position to attenuate glare.

Figure 3A:
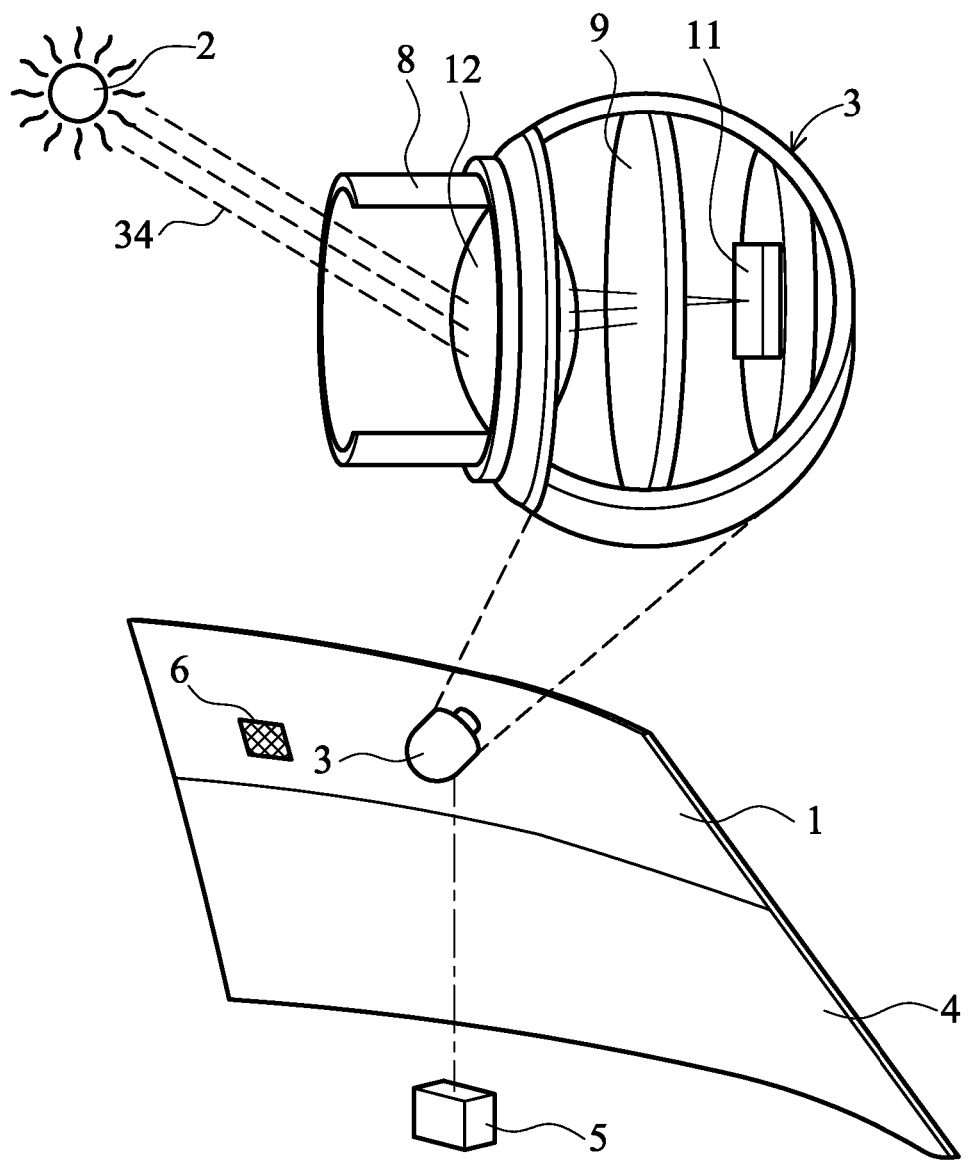
FIGS. 3A to 3B are schematic views showing another glare determination method using one exemplary embodiment of a glare reduction apparatus of the invention.
Figure 3B:
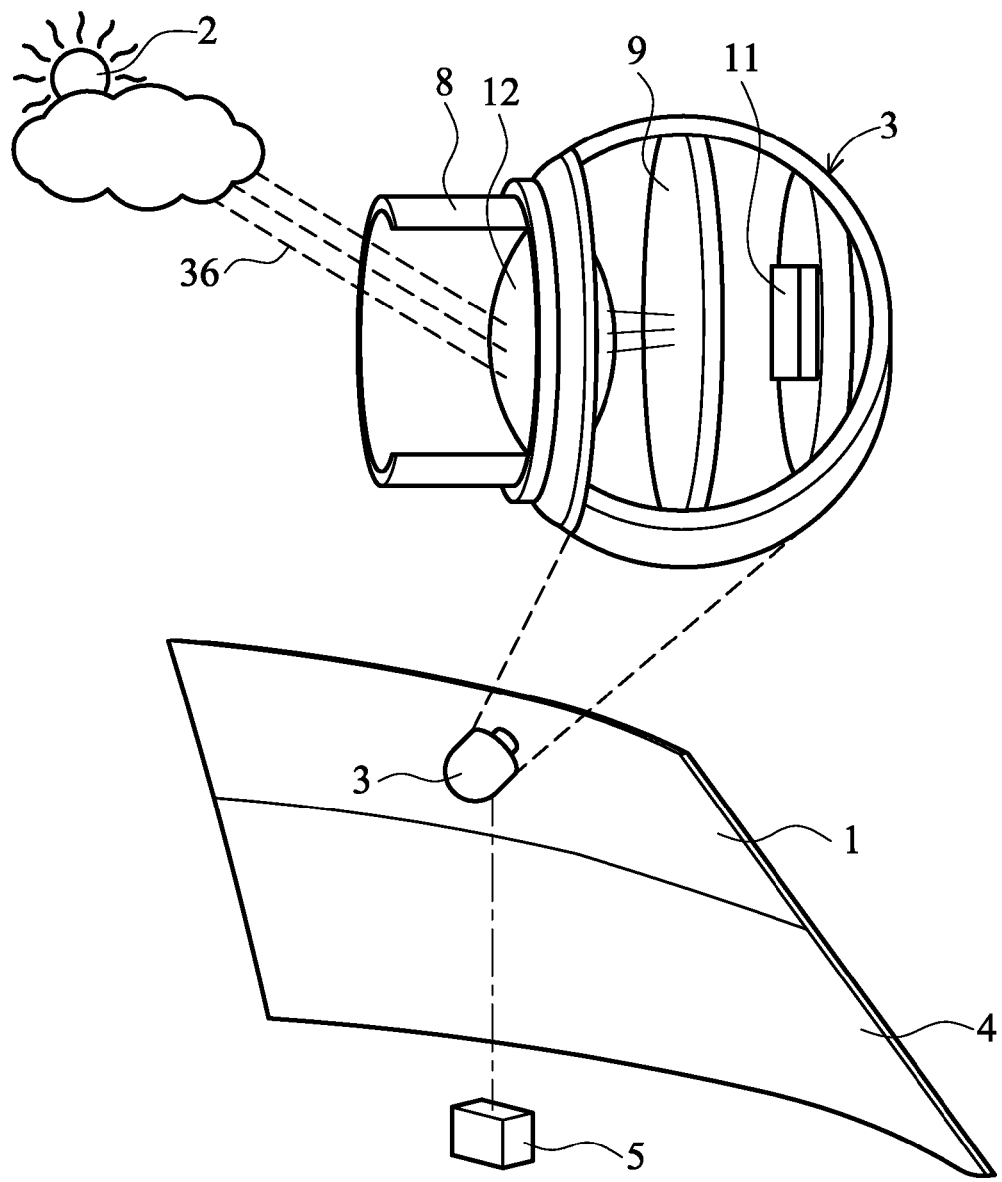

FIGS. 3A to 3B are schematic views showing another exemplary embodiment of a light sensing device and another glare determination method using one exemplary embodiment of a glare reduction apparatus of the invention. In another embodiment, the light sensing device 3 may further comprise a filter 9 disposed in front of the CCD array 11. Thus, the light from the light source 2 would be incident through the filter 9 to the CCD array 11 in sequence. As shown in FIGS. 3A to 3B, the filter 9 may be disposed between the CCD array 11 and the light blocking tube 8. In this embodiment, the filter 9 may have a defined shading rate to allow light having an intensity which is higher than a predefined value to pass through and block other light and images with an intensity lower than a predefined value. As shown in FIG. 3A, when light 34 from the light source 2 has an intensity high enough to pass through the filter 9 and be transformed into electronic signals by the CCD array 11 of the light sensing device 3, the CCD array 11 may transmit the electronic signals of the information of the light sensing position to the controller 5 by a image binarization method. The controller 5 may proceed with image identification by the binarization algorithm method to calculate a corresponding light sensing position of the electro-optical device 1, to reduce the light transmittivity of the corresponding light sensing position of the electro-optical device 1 to generate a light shielding region 6. As shown in 3B, when the light 36 from the light source 2 is attenuated or eliminated, for example, dimmed light on a cloudily day or due to the sun being blocked by something, the light 36 can not pass through the filter 9. Thus, in this case, no electronic signals are generated by the CCD array 11 of the light sensing device 3 and no electronic signals are transmitted to the controller 5. The electro-optical device 1 is not operated by the controller 5. Therefore, the electro-optical device 1 is fully transparent.

Figure 4:
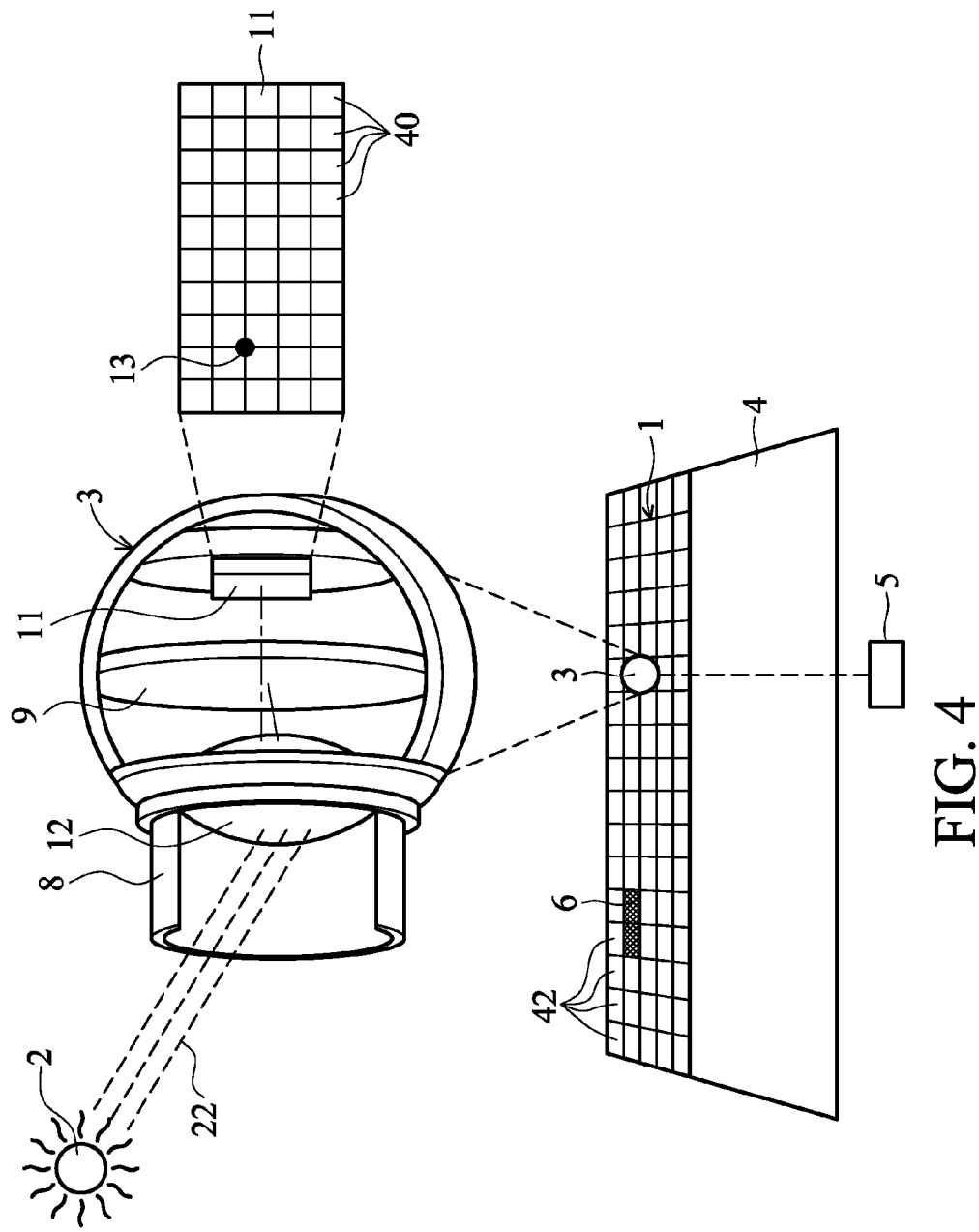
FIG. 4 is a schematic view of one exemplary embodiment of a light sensing device and an electro-optical device of the invention showing a corresponding relationship between a light sensing region of the light sensing device and a light shielding region of the electro-optical device.

FIG. 4 is a schematic view of one exemplary embodiment of a light sensing device 3 and an electro-optical device 1 of the invention showing a corresponding relationship between a light sensing region 13 of the light sensing device 3 and a light shielding region 6 of the electro-optical device 1. In one embodiment, the CCD array 11 of the light sensing device 3 and the electro-optical device 1 have a plurality of first pixel regions 40 and a plurality of second pixel regions 42, respectively. The second pixel regions 42 may have a corresponding relationship to the first pixel regions 40. Therefore, the controller 5 may uses a transform matrix method to define the occupied second pixel regions 42 occupied by the corresponding light sensing position according to the occupied first pixel regions 40 occupied by the light sensing position (can be illustrated as a matrix form), to generate the light shielding region 6.

Figure 5:
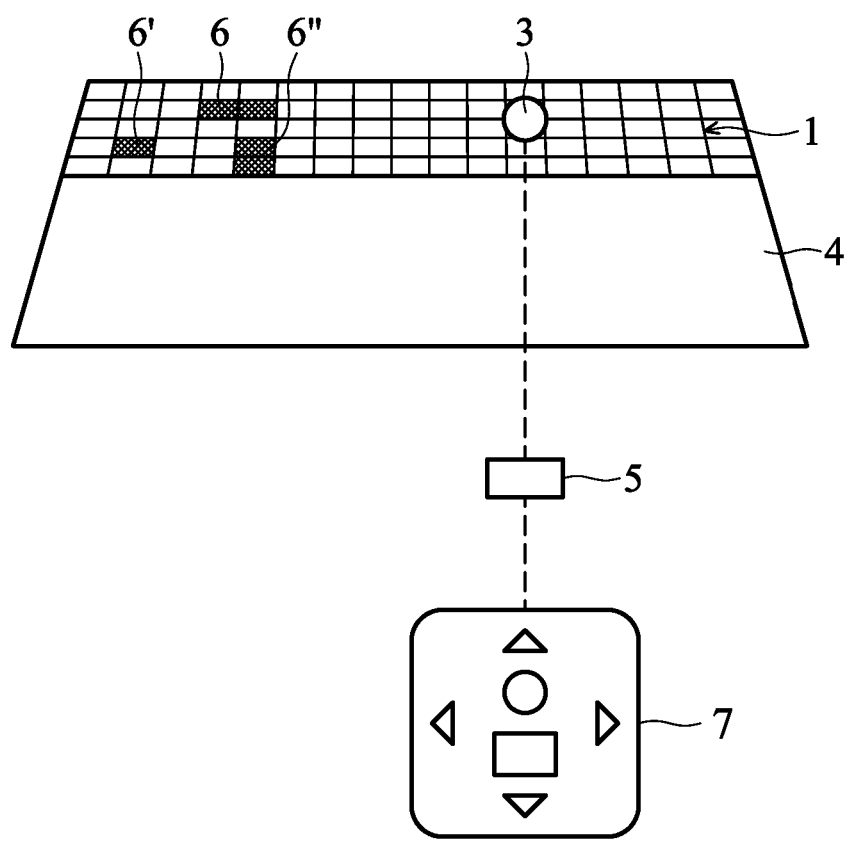
FIG. 5 is a schematic view for operating one exemplary embodiment of a position fine tuning switch of the invention.

In another embodiment, the glare reduction apparatus 500 may further comprise a position fine tuning switch 7 electrically coupled to the controller 5 as shown in FIG. 5, wherein the position fine tuning switch 7 may change a position and a size of the light shielding region 6 manually, to provide the controller 5 to correct and memorize a position difference between the driver's seat headrest and the pupil of the driver's eye. The driver may use the position fine tuning switch 7 to correct and set a position and a size of the light shielding region 6 manually. For example, a position of the light shielding region 6 may be moved to a light shielding region 6' or a light shielding region 6". Also, an amount of the occupied second pixel regions 42 occupied by the light shielding region 6 may be modified. Therefore, the glare reduction apparatus 500 may have more accurate shading efficiency. Additionally, the controller 5 can memorize various different correction values of the light shielding region, thereby suiting different drivers.

Figure 6:
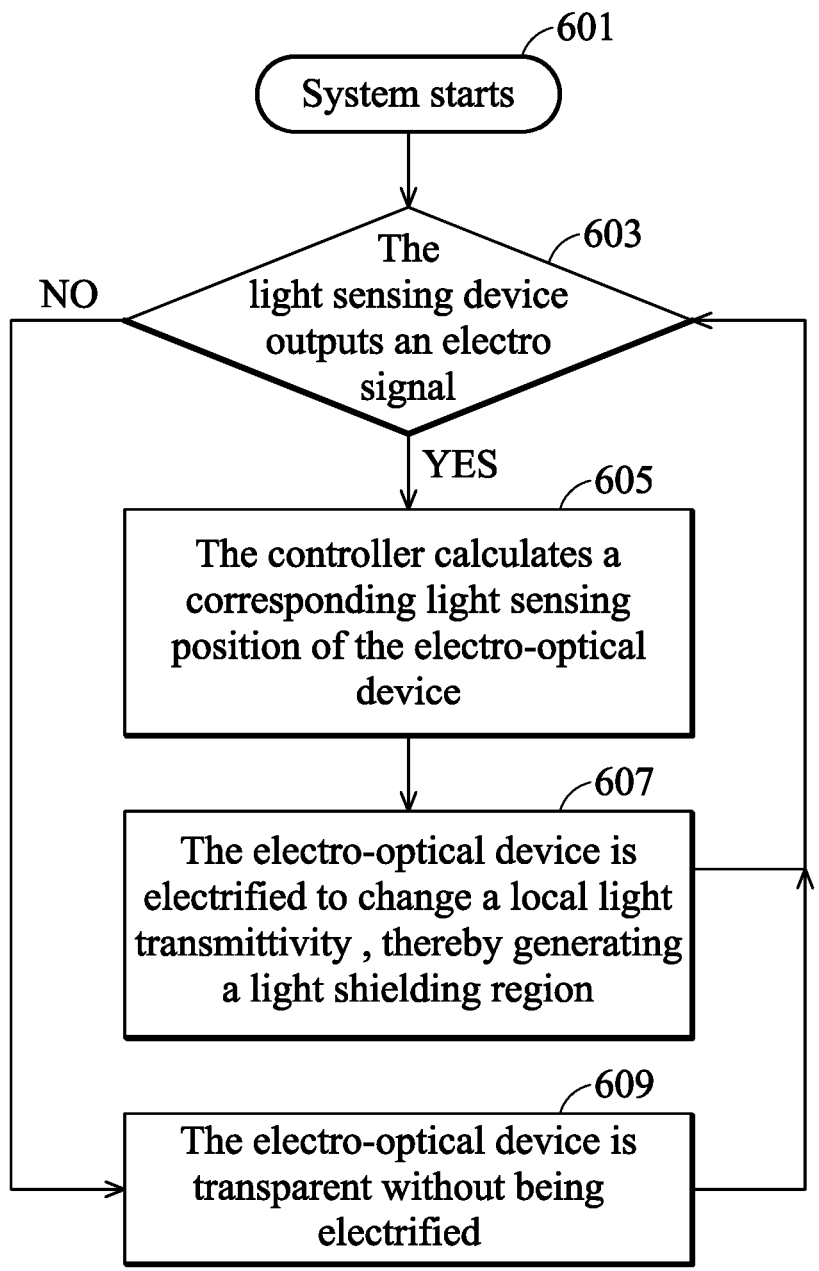
FIG. 6 is a flow chart for operating one exemplary embodiment of a glare reduction apparatus of the invention.

FIG. 6 is a flow chart for operating one exemplary embodiment of a glare reduction apparatus 500 of the invention. First, the glare reduction apparatus 500 is turned on in step 601 to start the system (the controller 5). Next, in step 603, the system detects whether an electronic signal is output by the light sensing device 3. If so and detected by the system, step 605 is performed, wherein that the controller 5 calculates a corresponding light sensing position of the electro-optical device according to a light sensing position of the light sensing device 3. Next, the electro-optical device is electrified to change a light transmittivity of the corresponding light sensing position, to generate a light shielding region (step 607). In the step 603, if not, the light sensing device 3 does not output an electronic signal, and the electro-optical device is fully transparent without being electrified.

One exemplary embodiment of a glare reduction apparatus 500 has the following advantages. When a glare is present, the controller may control the electro-optical device to automatically change local light transmittivity, to generate a light shielding region which attenuates glare. Other regions of the electro-optical device remain transparent, besides the light shielding region. Thus, view of a driver is not blocked. The controller may calculate a position of the light shielding region according to the information of the light sensing position of the light sensing device and the position of the driver's seat headrest. Also, the glare reduction apparatus 500 has a position fine tuning switch, which is used to set a position difference between the driver's seat headrest and the pupil of the driver's eye. Therefore, no complex and expensive devices such as a global positioning system (GPS) or sensors are added to detect the pupil of the driver's eye, so that manufacturing costs of the glare reduction apparatus may be reduced. Additionally, the light sensing device of the glare reduction apparatus 500 may add a light blocking tube to assure that the glare reduction apparatus 500 operates when glare affects vision of driver's. Further, the light sensing device of the glare reduction apparatus 500 may add a filter, so that only light, having a high enough intensity, may pass therethrough and light, not having a high enough intensity may be blocked. The light sensing device with the light blocking tube or the filter has a simply composition and allows the glare reduction apparatus 500 to automatically determine whether glare is present. The electro-optical device may only cover an upper portion of the windshield glass to prevent vision of the driver from being hindered for safer driving. Additionally, when the electro-optical device is not able be operated, the electro-optical device does not hinder vision of a driver.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A glare reduction apparatus disposed in an object illuminated by a light source, comprising:
    an electro-optical device covering a surface of the object;
    a light sensing device disposed on a first fixed point of the object; and
    a controller electrically coupled to the electro-optical device and the light sensing device, wherein the controller is configured to calculate a corresponding light sensing position of the electro-optical device according to a light sensing position of the light sensing device, which directly receives light from the light source, and a position of a second fixed point of the object, to reduce the light transmittivity of the corresponding light sensing position of the electro-optical device to generate a light shielding region which attenuates the light from the light source to the second fixed point of the object.

2. The glare reduction apparatus as claimed in claim 1, wherein the light sensing device further comprises a charge-coupled device (CCD) array used to detect the light sensing position transmitted to the controller.

3. The glare reduction apparatus as claimed in claim 2, wherein the light sensing device further comprises a light blocking tube disposed in front of the charge-coupled device (CCD) array, thereby the light from the light source is incident through the light blocking tube to the charge-coupled device (CCD) array in sequence.

4. The glare reduction apparatus as claimed in claim 3, wherein the light blocking tube blocks the light being incident to the charge-coupled device (CCD) array with an incident angle.

5. The glare reduction apparatus as claimed in claim 4, wherein the incident angle is larger than 60 degrees and less than or equal to 90 degrees of a vertical plane.

6. The glare reduction apparatus as claimed in claim 1, wherein the light sensing device further comprises a lens to guide the light being transmitted into the charge-coupled device (CCD) array.

7. The glare reduction apparatus as claimed in claim 1, wherein the light sensing device further comprises a filter disposed in front of the charge-coupled device (CCD) array, to incident the light from the light source through the filter to the charge-coupled device (CCD) array in sequence.

8. The glare reduction apparatus as claimed in claim 1, wherein the light sensing device has a plurality of first pixel regions and the electro-optical device has a plurality of second pixel regions corresponding to the first pixel regions, and the controller uses a transform matrix method to define the occupied second pixel regions occupied by the corresponding light sensing position according to the occupied first pixel regions occupied by the light sensing position, to generate the light shielding region.

9. The glare reduction apparatus as claimed in claim 1, further comprising a position fine tuning switch electrically coupled to the controller, wherein the position fine tuning switch manually changes a position and a size of the light shielding region.

10. The glare reduction apparatus as claimed in claim 1, wherein a relative position between the first fixed point and the second fixed point is fixed.

11. The glare reduction apparatus as claimed in claim 10, wherein the first fixed point is located between the light source and the second fixed point.

12. The glare reduction apparatus as claimed in claim 1, wherein the object is a vehicle, and the electro-optical device covers a surface of a windshield glass of the vehicle, and the second fixed point is located on a drivers seat headrest of the vehicle.

* * * * *